United States Patent [19]

Scherenberg et al.

[11] 4,231,592
[45] Nov. 4, 1980

[54] ARRANGEMENT OF A THREE-POINT AUTOMATIC BELT

[75] Inventors: Hans O. Scherenberg, Stuttgart; Rudolf Andres, Sindelfingen, both of Fed. Rep. of Germany

[73] Assignee: Daimler-Benz Aktiengesellschaft, Fed. Rep. of Germany

[21] Appl. No.: 920,681

[22] Filed: Jun. 30, 1978

[30] Foreign Application Priority Data

Jul. 2, 1977 [DE] Fed. Rep. of Germany ....... 2730081

[51] Int. Cl.³ .............................................. B60R 21/10
[52] U.S. Cl. .................................... 280/808; 297/481; 297/483
[58] Field of Search ............... 280/747, 746, 744, 745, 280/801, 807, 808; 297/389, 388, 387, 386, 385, 481, 483, 475, 474, 468

[56] References Cited

U.S. PATENT DOCUMENTS

| 3,415,536 | 12/1968 | Weman | 280/808 X |
| 3,907,329 | 9/1975 | Erion et al. | 280/808 |

FOREIGN PATENT DOCUMENTS

| 2557316 | 6/1977 | Fed. Rep. of Germany | 297/483 |
| 2710754 | 9/1977 | Fed. Rep. of Germany | 297/481 |

Primary Examiner—John J. Love
Assistant Examiner—Milton L. Smith
Attorney, Agent, or Firm—Craig & Antonelli

[57] ABSTRACT

An arrangement of a three-point automatic belt for a front seat with a preferably tiltable backrest in two-door motor vehicles with rear seats, whereby the roll-up mechanism of the belt is disposed within the area of the fixed vehicle side wall and a support member for the accommodation of the fixed point of the lower belt section is provided which, together with the belt band, is adapted to be transferred from a forward operating position into a rear position opening up the ingress to the rear seat places. The pivot movement of the coordinated door or of the backrest is utilized either directly or indirectly for transferring the support member from the one into the other end position.

9 Claims, 4 Drawing Figures

ARRANGEMENT OF A THREE-POINT AUTOMATIC BELT

The present invention relates to an arrangement of a three-point automatic belt for a front seat with a preferably tiltable backrest in a two-door motor vehicle having rear seating places, whereby the roll-up mechanism of the belt is disposed within the area of the rigid vehicle side wall and a support member for receiving the fixed point of the lower belt section is provided which, together with the belt band, is adapted to be transferred from a forward operating position into a rear position opening up the ingress to the rear seat places.

Such an arrangement is described in the German Offenlegungsschrift No. 25,57,316. The support member is retained in the forward tilted position by the intentionally remaining belt looseness and is adapted to be tilted back into the rear position by exerting a pressure on the belt band. As a result thereof, a free ingress to the rear seats is made possible; however, the handling and manipulation of the installation is not particularly appropriate since with a tilted down support member, the belt band can be reached only with difficulty for the engagement. Additionally, it is no longer assured after a long use of the belt that the belt band is always rolled up to the constructively predetermined length. As a result thereof, the danger then exists that too much belt looseness remains which impairs a free entry to the rear seats with a tilted down support member.

It is the aim of the present invention to provide an arrangement which can be handled in a particularly simple manner and which additionally exhibits an orderly functioning after a relatively long operating period of time.

Consequently, an arrangement of the aforementioned type is proposed whereby according to the present invention, the pivot movement of the coordinated door or of the backrest is utilized either directly or indirectly by triggering or releasing an auxiliary force installation for transferring the support member from the one into the other end position.

In one embodiment according to the present invention, at least one backrest fitting is extended beyond its point of rotation and the thus-created free end receives a Bowden cable which leads to the free arm end of the pivotal support member constructed two-armed.

In order that already small pivot movements of the backrest lead to a release of the support member, the point of pivotal connection of the Bowden cable to the free end of the backrest fitting is arranged farther away from the coordinated point of rotation or pivot point than the other point of pivotal connection to the support member.

In another embodiment of the present invention, the support member is constructed as a two-armed lever and a vacuum motor is pivotally connected to the arm thereof receiving the lower belt section whereas the free lever arm is acted upon by a spring acting opposite the servo force.

A simple control exists if the vacuum motor is connected during the opening of the associated door with the free atmosphere by a displacement valve cooperating with the door.

In order to be able to undertake a manual actuation in case of need, it is appropriate if the connection on the side of the support member with the Bowden cable or with the vacuum motor is cancelled out during manual pivoting of the support member.

Accordingly, it is an object of the present invention to provide an arrangement of a three-point automatic safety belt system which avoids by simple means the aforementioned shortcomings and drawbacks encountered in the prior art.

Another object of the present invention resides in an arrangement of a three-point automatic safety belt for motor vehicles which assures free acess to the rear seats in a two-door vehicle while facilitating the handling of the safety belt and its engagement.

A further object of the present invention resides in an arrangement of a three-point automatic safety belt for motor vehicles which assures ease of ingress to the rear seats even after long periods of use of the safety belt system.

Still a further object of the present invention resides in an arrangement for a three-point automatic safety belt which is simple in construction, utilizes relatively few parts and is highly reliable in operation over long periods of time.

These and other objects, features and advantages of the present invention will become more apparent from the following description when taken in connection with the accompanying drawing which shows, for purposes of illustration only, two embodiments in accordance with the present invention, and wherein.

Figure 1:
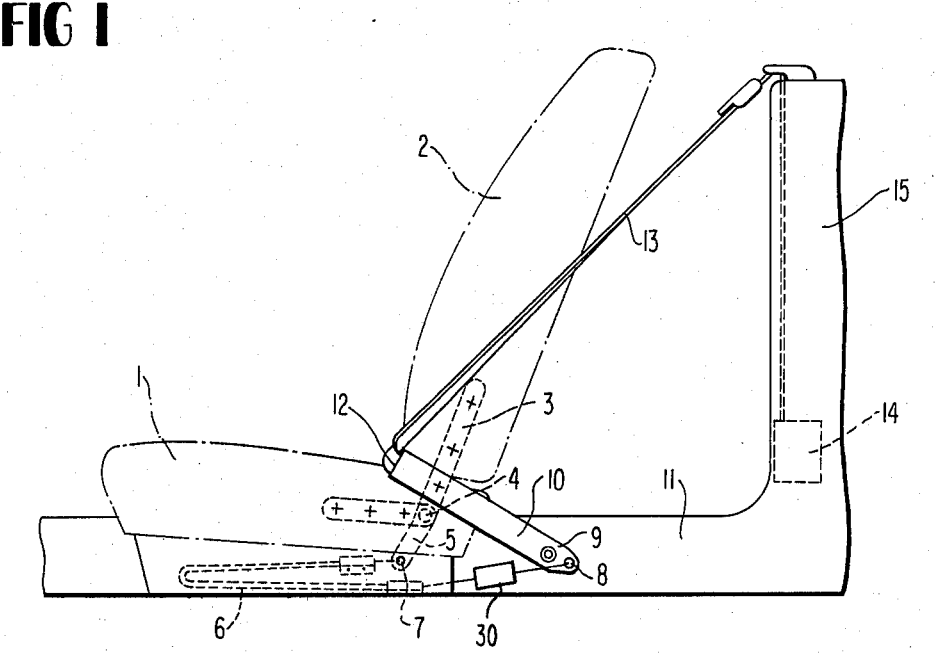
FIG. 1 is a somewhat schematic side elevational view of an arrangement in accordance with the present invention with a Bowden cable transmission actuated by the backrest and with a disengaged safety belt.

Referring now to the drawing wherein like reference numerals are used throughout the various views to designate like parts, a front seat 1 illustrated in dash and dotted lines in FIG. 1 is provided with a backrest 2 and is connected to the seat 1 by way of a backrest fitting 3.

The backrest fitting 3 is extended beyond its point of rotation 4, as a result of which a free end 5 is created which receives a Bowden cable 6. From this first point of pivotal connection 7 to the free end 5, the Bowden cable 6 leads to a further point of pivotal connection 8 to the free arm end 9 of a support member 10 which is pivotally secured to the threshold inner side 11.

At the other end of the support member 10 is located the fixed point 12 of the lower belt section 13 of a three-point automatic safety belt, whose roll-up mechanism 14 is accommodated within the area of the fixed vehicle side wall 15.

Figure 2:
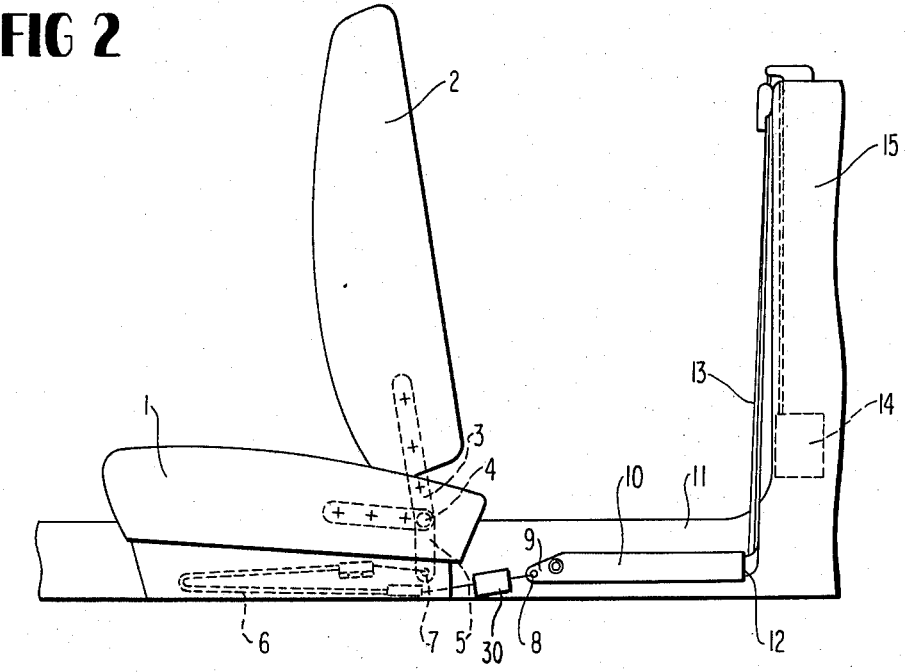
FIG. 2 is a somewhat schematic side elevational view, similar to FIG. 1, illustrating the arrangement thereof with the backrest tilted forwardly.
Figure 3:
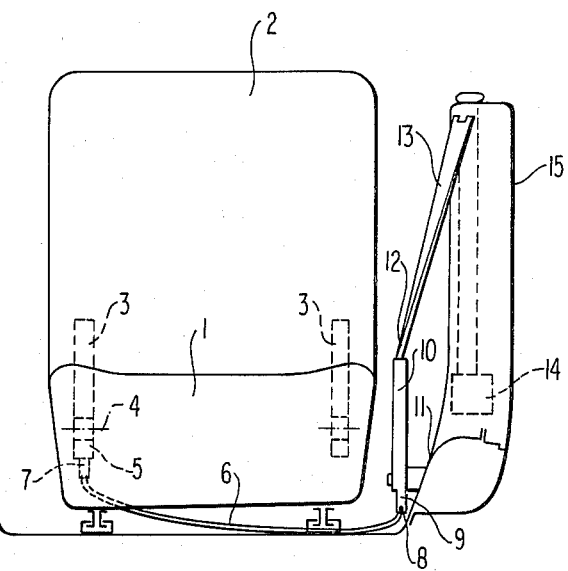
FIG. 3 is a somewhat schematic front elevational view of the arrangement of FIG. 1.

If the backrest, for example, for the more convenient ingress of a rear passenger is transferred into the forward tilted position, as shown in FIG. 2, then the free arm end 9 of the support member 10 is pivoted forwardly by the Bowden cable 6, and the support member 10 as well as the lower belt section 13 secured thereon assume a position which assures a free passage to the rear seat places (not shown). By reason of the fact that the point of pivotal connection 7 to the Bowden cable 6 to the free end 5 of the backrest fitting 3 is spaced further away from the associated pivot point 4 than the other point of pivotal connection 8 to the support member 10, a small pivot movement of the backrest 2 leads to a larger tilting movement of the support member 10.

Figure 4:
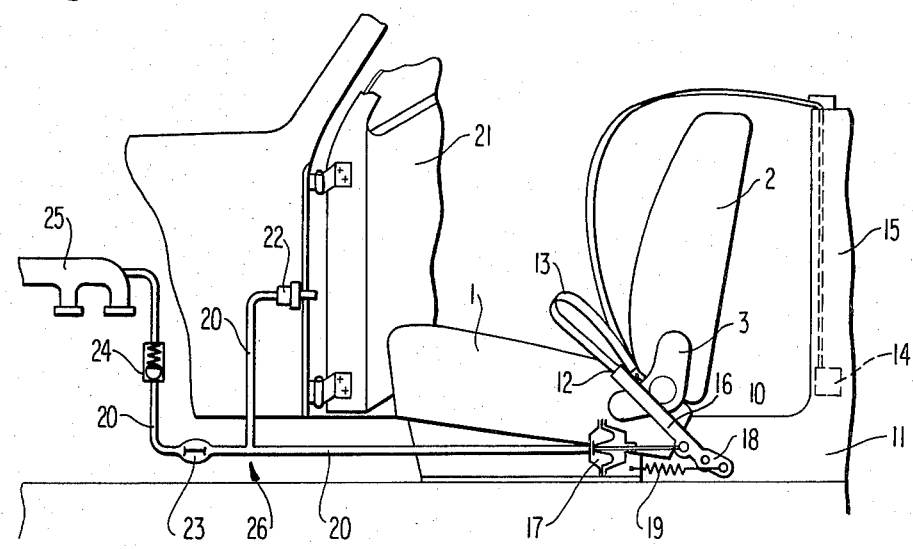
FIG. 4 is a somewhat schematic partial side elevational view, partly in cross section, through a modified arrangement in accordance with the present invention with a support member that is actuated by a vacuum motor and by a spring.

In the embodiment according to FIG. 4, a support member generally designated by reference numeral 10 is also constructed as two-armed lever, to the arm 16 of which receiving the lower belt section 13 is pivotally connected a vacuum motor 17 of any conventional construction, whereas the free lever arm 18 is acted upon by a spring 19. A line 20 which branches off, leads from the vacuum motor 17, on the one hand, to a displacement valve 22 actuated by the door 21 and, on the other, under interconnection of a throttle 23 and of a check valve 24 to the suction pipe 25 of an internal combustion engine (not shown).

One obtains by the arrangement described hereinabove an auxiliary force installation generally designated by reference numeral 26 which automatically transfers the support member 10 into the one or other end position in dependence on the position of the coordinated door 21.

The instant is illustrated in FIG. 4 of the drawing, in which the forward passenger (not shown) is about to release or disconnect the belt and has already opened the door 21. The line 20 is now connected by way of the valve 22 to the free atmosphere so that the vacuum space of the vacuum motor 17 is vented. The throtle 23 assures that the vacuum action from the suction pipe 25 is so slight that the spring 19 pulls the lever arm 18 forwardly so that the support member 10 together with the lower belt section 13 can be transferred into a position comparable to that in FIG. 2.

If the door 21 is again closed, then the connection to the free atmosphere is interrupted and the vacuum which now becomes effective, transfers the vacuum motor 17 and therewith the support member 10 against the force of the spring 19 into the position illustrated in FIG. 4.

If a manual actuation of the support member 10 is desired to transfer the same from the one into the other end position by means of a sliding movement in lieu of a pivot movement, the connection on the side of the support member with the Bowden cable 6 or with the vacuum motor 17 can then be lifted or cancelled out, for example, automatically by conventional means. In this respect, releasing means 30 is shown in FIGS. 1 and 2 as representing any conventional mechanism permitting a manual operation of the support member 10. In this connection, means 30 might for example be a spring whereby a manual movement of support member 10 could be accomplished without a respective movement of backrest 2 forwardly. This is true since such a spring would be elongated, thus effectively lengthening the Bowden cable 6, when the support member 10 is in a forward position as shown in FIG. 1. Subsequent movement of the support member 10 rearwardly to the position shown in FIG. 2 would result in the spring becoming less elongated, thus effectively shortening the length of Bowden cable 6, and of course, no movement of backrest 2 forwardly would be required. On the other hand, if the support member 10 were in the position shown in FIG. 1, a forward movement of backrest 2 would increase the strain on the already elongated spring and the invention would operate in the manner priorly discussed.

While a spring is a good example of releasing means 30, it should be recognized that any means which would result in a disconnection of the line 20 from its connection with support member 10 is within the scope of means 30. As such, even the severing of line 20, thus not requiring any attendant structure, is within the purview of means 30.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arrangement of a three-point automatic safety belt for a forward seat with a backrest in a two-door motor vehicle having rear seat means, said belt having a lower belt section and a belt band, said arrangement comprising roll-up means for the belt located within an area of a fixed vehicle side wall, and support means attached to said vehicle for receiving a fixed point of the lower belt section, the support means being operable to be transferred together with the belt band from a forward operating position into a rear position freeing the ingress to the rear seat means, wherein a pivot movement of at least one of a coordinated door and backrest is used for transferring the support means frrom one into another end position.

2. An arrangement according to claim 1, wherein the pivot movement is utilized directly for transferring the support means from the one into the other end position.

3. An arrangement according to claim 1, wherein the pivot movement is used indirectly by triggering an auxiliary force means for transferring the support means from the one into the other end position.

4. An arrangement according to claim 1, wherein the backrest is tiltable.

5. An arrangement according to claim 1, for seats with tiltable backrests, wherein at least one backrest fitting means of each seat is extended beyond its point of rotation and the thus-created free end receives a Bowden cable that leads to a free arm end of the pivotal support means which is constructed two-armed, the other of such two arms being associated with said belt.

6. An arrangement according to claim 5, wherein the point of pivotal connection of the Bowden cable at the free end of the backrest fitting means is arranged further away from the coordinated point of rotation of said backrest than is the other point of pivotal connection of said Bowden cable with respect to the coordinated point of rotation of said support means.

7. An arrangement according to claim 1, wherein the support means is constructed as two-armed lever, a vacuum motor being pivotally connected to the arm of the two-armed lever receiving the lower belt section and being operable in response to a movement of at least one of said door and backrest, whereas the free lever arm is acted upon by a spring acting opposite a servoforce of the vacuum motor.

8. An arrangement according to claim 7, wherein the vacuum motor is connected with the free atmosphere during the opening of the coordinated door by a valve means cooperating with said door.

9. An arrangement according to claims 1, 2, 3, 4, 5, 6, 7 or 8, characterized by means for effectively releasing the operative connection on the side of the support means with one of either a Bowden cable or a vacuum motor during manual pivoting of the support means.

* * * * *